July 8, 1958 J. LIEBEL 2,842,226
DIFFERENTIAL LUBRICATION
Filed Aug. 13, 1956
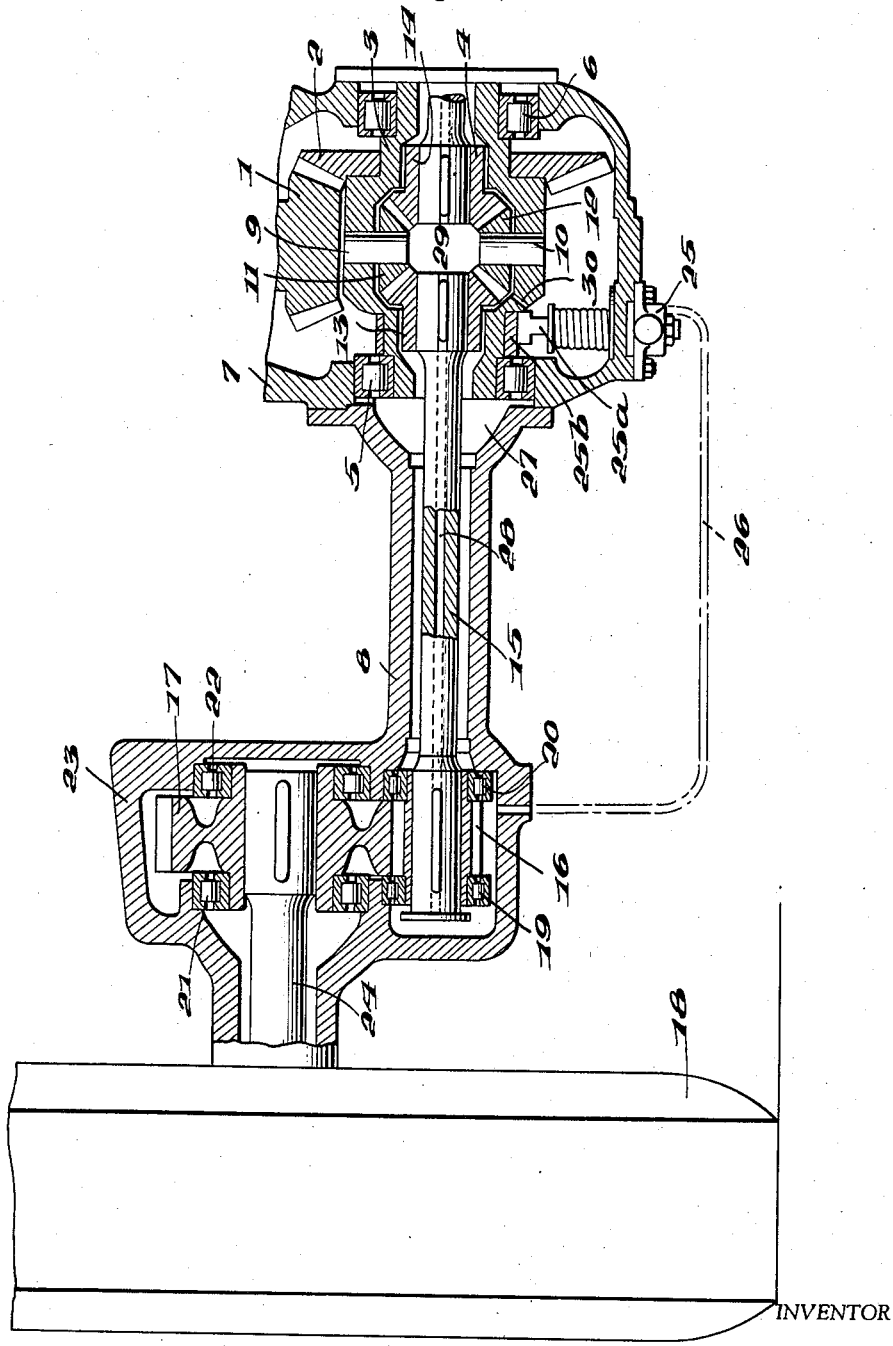
INVENTOR
JULIUS LIEBEL,
BY
ATTORNEYS

United States Patent Office 2,842,226
Patented July 8, 1958

2,842,226
DIFFERENTIAL LUBRICATION

Julius Liebel, Nurnberg, Germany, assignor to Maschinenfabrik Augsburg-Nurnberg A. G., Nurnberg, Germany Application August 13, 1956, Serial No. 603,654

Claims priority, application Germany August 20, 1955

1 Claim. (Cl. 184—6)

This invention relates to differential lubrication. In particular, the invention is directed to the lubrication of the differential and wheel driving gears for a vehicle.

In vehicles, the axles for the driving wheels are usually coupled by a differential gear. This differential is composed of a pinion on the engine propeller shaft which meshes with a beveled ring gear which in turn rotates the differential case containing the differential pinions and gears, with the latter being joined to the axle shafts. This differential gear is for the purpose of permitting one wheel to turn faster than another when rounding corners with power applied to both wheels. The differential gear is usually lubricated by the lifting of lubricant from a sump by means of the ring gear which distributes the lubricant on the exterior of the differential pinions and gears. Under normal running condition, this means of lubrication is adequate.

In some cases, however, the differential gear is operating for a much longer time than under normal conditions and under a heavy load. This will occur, for example, in a heavy truck which is climbing a long curving hill or an icy hill. Under icy conditions, one of the driving wheels may be slipping and rotating at a higher speed than the other wheel. In such circumstances, there is considerable danger that the lubrication is insufficient and that the differential gear will be damaged.

The object of this invention is to produce means for providing an adequate lubrication of the differential gear under all operating conditions.

In general, this is accomplished by providing, in addition to the usual oil sump, a means for forcing lubrication through the differential gear. The lubricant is made to flow from the center of the differential gear outwardly through the various meshing gears so as to insure a thorough lubrication of the gears while the normal run of the bevel ring gear through the oil sump is continued. The movement of the lubricant in the gears is assisted by the centrifugal forces produced by the rotating gears.

Moreover, in vehicles having reduction gears between the axle and the driving wheels, and in which the axle is of short length, it is possible to circulate the lubricant between the differential gears and the reducing gears. This is accomplished by axially boring the axles to form an oil passage between the differential gear and the reducing gears, and by providing an oil pump for cycling the lubricant therebetween.

The means by which the objects of the invention are obtained are described more fully with reference to the accompanying drawing, which shows a cross-sectional view through a differential gear and the axle and reducing gears for one half of a vehicle, the structure for the other wheel being similar.

The bevel drive pinion 1 is rotated by the engine propeller shaft and drives bevel ring gear 2. This ring gear is connected to the differential case 3 containing the various differential gears 4. The case 3 is mounted by means of roller bearings 5 and 6 within a differential housing 7 which is connected to the axle housing 8. Differential pinions 11 and 12 are mounted in casing 3 by means of the stub shafts 9 and 10, respectively. These pinions drive the differential gears 13 and 14 which are secured to the axles 15. Axle 15 extends to the wheel reduction gear which is composed of a spur gear 16 connected to axle 15 which meshes with spur gear 17 for the purpose of driving vehicle wheel 18. Spur gears 16 and 17 are mounted by means of roller bearings 19, 20, 21 and 22 within reduction gear housing 23 which is an extension of axle housing 8. Spur gear 17 is keyed to jack shaft 24 for driving wheel 18.

Mounted within differential housing 7 is a lubricating pump 25. The pump plunger 25a is actuated by cam 25b, secured to and rotatable with case 3. The outlet end of pump 25 is connected to reduction gear housing 23 by means of oil line 26. Upon operation of pump 25, oil in housing 23 will flow through the space between axle housing 8 and axle 15 into the widened axle housing space 27 and from there into differential housing 7. A more intense lubrication is produced by means of the central bore 28 in axle housing 8 which forms an oil passage between gear reduction housing 23 and the space 29 centered in the differential gear inside of the differential spider around which are mounted the gears 11 and 12 and 13 and 14, respectively. Oil forced from housing 23 through bore 28 fills space 29 and thus is forced outwardly through the space through the meshing gears, this flow of oil being further actuated by the centrifugal force produced by the gears. Furthermore, oil flows through ports 30 in case 3 so that lubrication is provided for the roller bearings, and the oil then drains back into casing 7 for further delivery to pump 25.

In gear reducing housing 23, a high enough pressure is developed in order to force sufficient lubrication through bore 28 into space 29 with differential gear 4.

Having now described the means by which the objects of the invention are obtained,

I claim:

A driving mechanism for a pair of vehicle wheels comprising a pair of wheels, an axle for each wheel, a reduction gear connecting each axle to its respective wheel, a differential gear connected between the axles, a housing for said differential gear, an oil pump in said housing, an oil line extending between said pump to each reduction gear for the flow of lubricating oil from said pump to said reduction gear, and an axial bore in at least one of the axles for the passage of oil from said reduction gear to the center of said differential gear for lubricating the gear elements thereof by the outward flow of oil therethrough and back to said oil pump.

References Cited in the file of this patent

UNITED STATES PATENTS

| 2,378,615 | Brown | June 19, 1945 |
| 2,408,336 | Orr | Sept. 24, 1946 |

FOREIGN PATENTS

| 624,970 | Great Britain | June 20, 1949 |
| 176,457 | Austria | Oct. 26, 1953 |